United States Patent

Bruccoleri et al.

[11] Patent Number: 6,031,750
[45] Date of Patent: Feb. 29, 2000

[54] CONSTANT CURRENT SUPPLY OVER A WIDE RANGE OF INPUT VOLTAGES

[75] Inventors: Damon F. Bruccoleri, Long Branch, N.J.; Paul Soccoli, Flushing, N.Y.; Michael Ostrovsky, Brooklyn, N.Y.; Alfred J. Lombardi, LaGrangeville, N.Y.

[73] Assignee: Leviton Manufacturing Co., Inc., Little Neck, N.Y.

[21] Appl. No.: 09/219,536

[22] Filed: Dec. 22, 1998

[51] Int. Cl.[7] ............................................. H02M 7/06
[52] U.S. Cl. ................................. 363/126; 323/316
[58] Field of Search .................... 323/312, 316; 363/126

[56] References Cited

U.S. PATENT DOCUMENTS 4,256,987  3/1981  Takeuchi et al. ............ 310/316.01
4,301,407  11/1981  Koslar .............................. 324/96

*Primary Examiner*—Shawn Riley
*Attorney, Agent, or Firm*—Paul J. Sutton

[57] ABSTRACT

Two transistors are arranged as a Darlington amplifier to produce a constant current through an output resistor coupled to the emitter of the second transistor. AC power is supplied to a full wave bridge which converts the AC power from the source to a DC signal. A first zener diode and the base to emitter voltage drops of the transistors control the voltage across the output resistor. As the input voltage to the bridge is increased above the voltage between the emitter of the second transistor and ground, the extra voltage will be dropped across the collector to emitter of the second transistor. The same current will flow through the output resistor regardless of any input voltage in a defined range. By adding a resistor and diode and detecting the voltage between the resistor and diode with respect to the circuit the zero crossings can be detected.

4 Claims, 2 Drawing Sheets

CONSTANT CURRENT SUPPLY OVER A WIDE RANGE OF INPUT VOLTAGES

BACKGROUND OF THE INVENTION

1. Field of the Invention

The invention applies to power supplies to provide current to a load and, more particularly, to a power supply which can provide a constant current over a wide range of input voltages.

2. Description of the Prior Art

In order to supply current to a load with a range of input voltages it was necessary to use transformers with multiple taps and each of these had to be coupled correctly to the load. A single such transformer could have taps for 120V and 277V and these would have to be correctly connected to a load requiring 120V or 277V or the load could be damaged. For example, if a 120V load was connected to the 277V tap the 120V load would be destroyed. The presence of the leads for multi-tap transformers in a single device could be confusing to the installer and makes assembly of the device in available gang boxes difficult.

SUMMARY OF THE INVENTION

The instant invention overcomes the difficulties noted above with respect to power supplies by providing a power supply which produces a constant current regardless of the applied line voltage and eliminates the confusion caused by multi-tap devices by employing a single power input wire and return as well as the convenience of having one wire for multiple voltages.

Due to Underwriters Laboratories, Inc. (UL) regulations on ground-leakage type power supplies, the maximum current allowable is 500 $\mu$A (from line to ground). This power supply will keep the input current under the UL limit regardless of the load applied to the power supply.

It is an object of this invention to provide a circuit which can operate with multiple input voltages.

It is an object of this invention to provide a circuit which produces a constant current regardless of the input voltage.

It is still another object of this invention to provide a constant current source which is small in size and safe to use.

Other objects and features of the invention will be pointed out in the following description and claims and illustrated in the accompanying drawings, which disclose, by way of example, the principles of the invention, and the best modes which are presently contemplated for carrying them out.

BRIEF DESCRIPTION OF THE DRAWINGS

In the drawings in which similar elements are given similar reference characters.

DESCRIPTION OF THE PREFERRED EMBODIMENT

Figure 1:
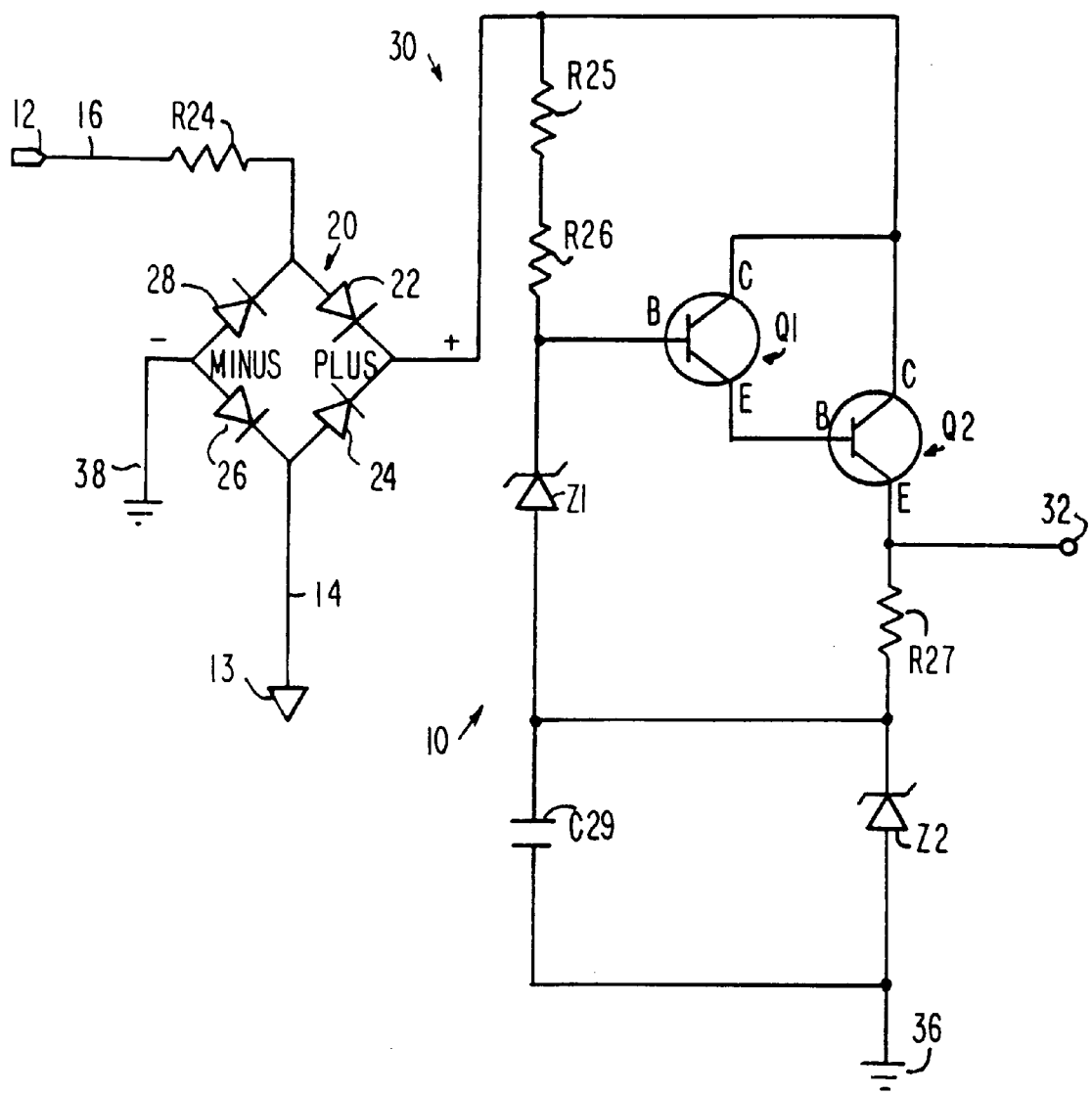
FIG. 1 is a schematic diagram of a circuit constructed in accordance with the concepts of the invention.

Referring to FIG. 1, there is shown a schematic diagram of a constant current source 10 which can be used with different input voltage levels. For example, the input voltage levels can range from 120 to 347 volts AC. Accounting for a 15% tolerance in the levels of the AC voltages this could cover a range of 102 to 400 V AC. Regardless of the value of input voltage, in this range, applied to the circuit, a constant current is provided. An AC source (not shown) is coupled to constant current source 10 by the line or phase terminal 12 and the AC ground or neutral input terminal 13. The AC is on line 16 from the terminal 12 and on line 14 from the neutral or ground input terminal 13. The AC is fed to a bridge 20 made up of diodes 22, 24, 26 and 28 to produce a DC voltage level. The anode of diode 22 is coupled to the cathode of diode 28 and the AC line 16. The cathode of diode 22 is coupled to the cathode of diode 24 and to a signal line 30. The anode of diode 24 is coupled to the cathode of diode 26 and to the neutral line 14. The anode of diode 26 is coupled to the anode of diode 28 and to a circuit ground 38. A resistor $R_{24}$ is placed in the line 16 to save some lost current in low current applications. The use of resistor $R_{24}$ is optional.

The DC level on line 30 is applied to two resistors $R_{25}$ and $R_{26}$ in series to limit the current applied to the circuit and bias the base B of tiansistor $Q_1$. The base B of transistor $Q_1$ is also connected to the cathode of a zener diode $Z_1$. The transistor $Q_1$ acts as an emitter follower and the emitter E of transistor $Q_1$ is connected to the base B of transistor $Q_2$. The collectors C of transistors $Q_1$ and $Q_2$ are connected to signal line 30. The output at emitter E of transistor $Q_2$ is coupled to a resistor $R_{27}$. The transistors $Q_1$ and $Q_2$ are connected as a Darlington amplifier or cascaded emitter followers. The resistors $R_{25}$ and $R_{26}$ limit the voltage applied to zener diode $Z_1$ to prevent burnout and limit the amount of current not delivered efficiently to the load. The output at the emitter E of transistor $Q_2$ is applied to one side of the output resistor $R_{27}$. The other side of resistor $R_{27}$ is connected to the cathode of zener diode $Z_2$ and to ground 36 through bypass capacitor $C_{29}$. The use of the bypass capacitor $C_{29}$ is optional.

A zener diode $Z_2$ is connected with its cathode coupled to the second end of resistor $R_{27}$ and its anode connected to a circuit ground 36. A bypass capacitor $C_{29}$ is connected at one plate to the circuit ground 36 and at its other plate to the anode of zener diode $Z_1$ and the cathode of zener diode $Z_2$. The constant current source 10 will regulate the current through the resistor $R_{27}$. The zener diode $Z_1$ and the base B to emitter E voltage drop of transistors $Q_1$ and $Q_2$ will determine the voltage across $R_{27}$. The voltage, $V_{e2}$ from the emitter E of transistor $Q_2$ to ground 36 will be fixed.

As the input voltage at terminals 12 and 13, and via lines 16 and 14 to bridge 20 increases above voltage $V_{e2}$ the extra voltage will be dropped across the collector C to emitter E of transistor $Q_2$, this is voltage $V_{ce2}$. Therefore, the same current will flow through resistor $R_{27}$ for input voltages in the range of 102 to 400 Volts. This allows the use of one connection or terminal 12 for the line or phase power input and one terminal 13 for the AC ground/neutral power return. The voltage applied to resistor $R_{27}$ at terminal 32 may be used as an input to a load or as the input to some other regulation circuitry that will output the voltage and current necessary to power the application circuitry. The constant current source 10 is also useful to limit the supply current for lighting control devices. In the case of a ground leakage type power supply, it is necessary to limit the leakage current to safe levels. Current is leaked from the input line 16 to terminal 13, which may be either a neutral line or the circuit ground. This is the building ground. Ground point 36 is the system ground or reference point for an application circuitry. The accepted level of leakage current is 500 $\mu$A. The constant current source 10 will limit the current regardless of the load applied to it.

Figure 2:
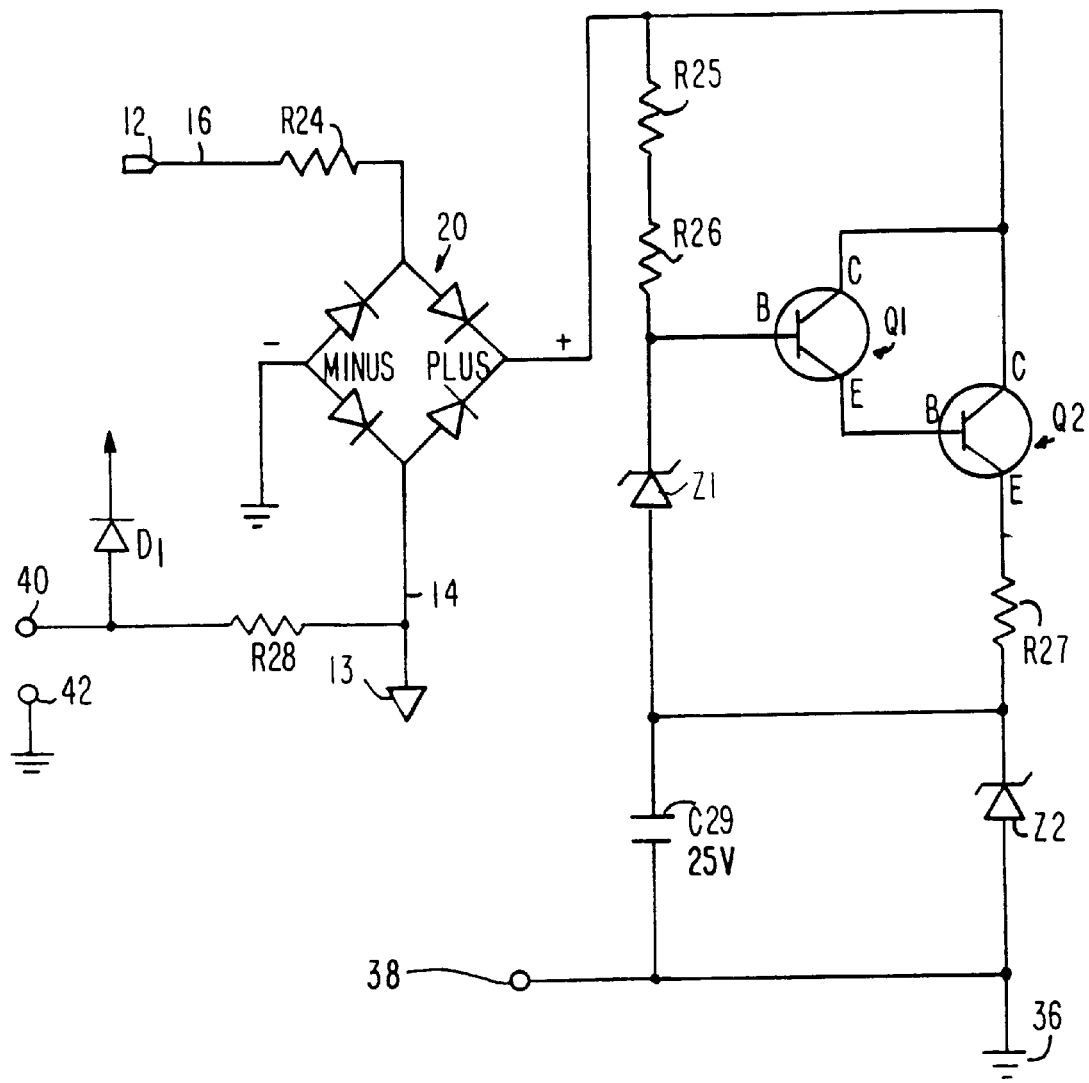
FIG. 2 is a schematic diagram of a modification of the circuit of FIG. 1.

FIG. 2 shows a modification of the circuit of FIG. 1 to add a zero crossing signal output by connecting to line 14. One or two resistors $R_{28}$ of a high value of resistance can be connected from line 14 to the anode of diode $D_1$. The zero crossing signal is read between terminal 40 and a grounded terminal 42. The cathode of the diode $D_1$, will be connected to the regulated operating voltage at a regulated DC voltage taken from zener diode $Z_2$. A system ground is available at terminal 38.

While there have been shown and described and pointed out the fundamental novel features of the invention as applied to the preferred embodiments, as are presently contemplated for carrying them out, it will be understood that various omissions and substitutions and changes of the from and details of the devices illustrated and in their operation may be made by those skilled in the art, without departing from the spirit of the invention.

We claim:

1. A multi-voltage power supply to supply constant current from a phase terminal to a neutral or ground terminal, comprising:
   a) a bridge circuit having four connection points for coupling said bridge circuit to different input and output signals;
   b) a first one of said connection points connected to a phase conductor of an AC power source;
   c) an amplifier coupled to a second one of said connection points of said bridge circuit to receive therefrom a DC signal, said amplifier is made up of a first transistor and a second transistor connected as a Darlington amplifier;
   d) said first transistor of said amplifier has a base coupled to said second connection point of said bridge circuit, a collector coupled to said second connection point of said bridge circuit and an emitter, said second transistor has a base coupled to said emitter of said first transistor, a collector coupled to said second connection point of said bridge circuit and an emitter coupled to one end of a resistor;
   e) a first zener diode coupled between a second end of said resistor and a circuit ground;
   f) a capacitor coupled in parallel with said first zener diode;
   g) a third one of said connection points of said bridge circuit coupled to a first terminal connected to a neutral conductor or a building ground;
   h) a second zener diode connected at a first end to said capacitor and at a second end to said base of said first transistor;
   i) said amplifier having an output terminal whereby a constant current is available between said output terminal of said amplifier and said first terminal regardless of whether said first terminal is connected to a neutral conductor or building ground.

2. A multi-voltage power supply, as defined in claim 1, wherein at least one further resistor is coupled between said second connection point of said bridge circuit and said base of said first transistor.

3. A multi-voltage power supply, as defined in claim 1, wherein said bridge circuit connection to said phase conductor at said first connection point comprises:
   a) an additional resistor.

4. A multi-voltage power supply, as defined in claim 1, wherein:
   a) a neutral conductor of said AC power supply is connected to a neutral terminal coupled to said bridge circuit third connection point through an additional resistor and a diode whereby a zero crossing can be detected between said neutral and phase terminals or between said circuit ground and said phase terminal.

* * * * *